(12) United States Patent
Desouza et al.

(10) Patent No.: US 7,829,236 B2
(45) Date of Patent: Nov. 9, 2010

(54) HYDRATION SENSOR APPARATUS FOR MEASURING MEMBRANE HYDRATION IN A FUEL CELL STACK

(75) Inventors: Andrew J. Desouza, Surrey (CA); Herwig R. Haas, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 1027 days.

(21) Appl. No.: 11/561,243

(22) Filed: Nov. 17, 2006

(65) Prior Publication Data
US 2007/0134527 A1  Jun. 14, 2007

Related U.S. Application Data

(60) Provisional application No. 60/750,690, filed on Dec. 14, 2005.

(51) Int. Cl.
*H01M 8/04* (2006.01)
(52) U.S. Cl. ..................................................... 429/468
(58) Field of Classification Search ........................ None
See application file for complete search history.

(56) References Cited

U.S. PATENT DOCUMENTS

| | | | |
|---|---|---|---|
| 7,087,326 B2 | 8/2006 | Imamura et al. | |
| 2003/0141188 A1 | 7/2003 | Imamura et al. | |
| 2004/0197621 A1* | 10/2004 | Balliet et al. | 429/22 |
| 2005/0136313 A1* | 6/2005 | Van Dine | 429/32 |
| 2007/0026273 A1* | 2/2007 | Okamoto | 429/22 |

* cited by examiner

*Primary Examiner*—Robert Hodge
(74) *Attorney, Agent, or Firm*—Crowell & Moring LLP

(57) ABSTRACT

A fuel cell system comprising a fuel cell stack and at least one hydration sensor apparatus for measuring membrane hydration in the fuel cell stack is disclosed. The hydration sensor apparatus comprises (1) an electrically insulated sensor comprising a polymer electrolyte membrane, (2) a power supply, and (3) a load resistor. The sensor, the power supply and the load resistor of the hydration sensor apparatus are electrically connected and the sensor of the hydration sensor apparatus is fluidly connected to the fuel cell stack such that, during operation of the fuel cell system, the polymer electrolyte membrane of the hydration sensor apparatus is exposed to a fuel fluid stream of the fuel cell stack.

33 Claims, 8 Drawing Sheets

HYDRATION SENSOR APPARATUS FOR MEASURING MEMBRANE HYDRATION IN A FUEL CELL STACK

CROSS-REFERENCE TO RELATED APPLICATION

This application claims the benefit under 35 U.S.C. §119 (e) of U.S. Provisional Patent Application No. 60/750,690 filed Dec. 14, 2005, where this provisional application is incorporated herein by reference in its entirety.

BACKGROUND OF THE INVENTION

1. Field of the Invention

The present invention relates generally to electrochemical fuel cell systems, and, more particularly, to fuel cell systems comprising a fuel cell stack and at least one hydration sensor apparatus for measuring membrane hydration in the fuel cell stack.

2. Description of the Related Art

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst, disposed at the interfaces between the electrolyte and the electrodes, typically induces the desired electrochemical reactions at the electrodes. The location of the electrocatalyst generally defines the electrochemically active area.

One type of electrochemical fuel cell is the polymer electrolyte membrane (PEM) fuel cell. PEM fuel cells generally employ a membrane electrode assembly (MEA) comprising a solid polymer electrolyte or ion-exchange membrane disposed between two electrodes. Each electrode typically comprises a porous, electrically conductive substrate, such as carbon fiber paper or carbon cloth, which provides structural support to the membrane and serves as a fluid diffusion layer. The membrane is ion conductive (typically proton conductive), and acts both as a barrier for isolating the reactant streams from each other and as an electrical insulator between the two electrodes. A typical commercial PEM is a sulfonated perfluorocarbon membrane sold by E.I. Du Pont de Nemours and Company under the trade designation NAFION®. The electrocatalyst is typically a precious metal composition (e.g., platinum metal black or an alloy thereof) and may be provided on a suitable support (e.g., fine platinum particles supported on a carbon black support).

In a fuel cell, a MEA is typically interposed between two separator plates that are substantially impermeable to the reactant fluid streams. The plates typically act as current collectors and provide support for the MEA. In addition, the plates may have reactant channels formed therein and act as flow field plates providing access for the reactant fluid streams to the respective porous electrodes and providing for the removal of reaction products formed during operation of the fuel cell.

In a fuel cell stack, a plurality of fuel cells are connected together, typically in series, to increase the overall output power of the assembly. In such an arrangement, one side of a given separator plate may serve as an anode flow field plate for one cell and the other side of the plate may serve as the cathode flow field plate for the adjacent cell. In this arrangement, the plates may be referred to as bipolar plates. Typically, a plurality of inlet ports, supply manifolds, exhaust manifolds and outlet ports are utilized to direct the reactant fluid to the reactant channels in the flow field plates.

A broad range of reactants can be used in PEM fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a PEM fuel cell, fuel is electrochemically oxidized on the anode side, typically resulting in the generation of protons, electrons, and possibly other species depending on the fuel employed. The protons are conducted from the reaction sites at which they are generated, through the membrane, to electrochemically react with the oxidant on the cathode side. The electrons travel through an external circuit providing useable power and then react with the protons and oxidant on the cathode side to generate water reaction product.

Water management issues are critical in PEM fuel cell operation. As the water content of the membrane falls, it loses the ability to transport protons, its electrical resistance increases, fuel cell performance decreases and membrane failure may occur. Accordingly, to ensure adequate humidification of the membrane, one or both of the reactant streams supplied to the fuel cell stack are typically humidified. However, if the water content of the membrane becomes too great, through, for example, excessive humidification or accumulation of water reaction product, the membrane may become flooded, thereby disturbing the diffusion of reactants and also resulting in a decrease in fuel cell performance.

Various different systems and methods have been developed for monitoring and controlling MEA humidification, or hydration, levels in fuel cell stacks. Typically, fuel cell resistance is calculated from voltage and current measurements and then, since the fuel cell resistance varies as a function of the humidity level of the fuel cell, the humidity level of the fuel cell is determined. Alternatively, a sensor may be used to measure the relative hydration of a reactant stream circulated to a fuel cell stack and, based upon this measurement, the hydration level of the MEAs and, implicitly, the membranes may be evaluated. For example, U.S. Patent Application No. 2003/0141188 discloses a hydration sensor comprising a fuel cell having a first electrode exposed to a measurement gas, the gas for which the moisture content is to be determined, and a second electrode exposed to a reference gas, a gas for which the moisture content is known. By monitoring the voltage and current of such fuel cell, the hydration level of the measurement gas may be determined. However, such a sensor further requires that a reference gas, separate from the measurement gas, also be provided to the sensor. As a result a fuel cell system comprising such a sensor becomes more complex.

Accordingly, although there have been advances in the field, there remains a need for improved and simplified systems and methods for monitoring and controlling membrane hydration levels in fuel cell stacks. The present invention addresses these needs and provides further related advantages.

BRIEF SUMMARY OF THE INVENTION

In brief, the present invention relates generally to electrochemical fuel cell systems, and, more particularly, to a fuel cell system comprising a fuel cell stack and at least one hydration sensor apparatus for measuring membrane hydration in the fuel cell stack.

In one embodiment, a fuel cell system comprising a fuel cell stack and a hydration sensor apparatus for measuring membrane hydration in the fuel cell stack is provided, the hydration sensor apparatus comprising: (1) an electrically insulated sensor comprising a polymer electrolyte membrane; (2) a power supply; and (3) a load resistor, wherein the sensor, the power supply and the load resistor of the hydration sensor apparatus are electrically connected, and wherein the sensor of the hydration sensor apparatus is fluidly connected to the fuel cell stack such that, during operation of the fuel cell system, the polymer electrolyte membrane of the hydration sensor apparatus is exposed to a fuel fluid stream of the fuel cell stack.

In a further embodiment, the sensor of the hydration sensor apparatus is fluidly connected to an anode outlet port of the fuel cell stack such that, during operation of the fuel cell system, the polymer electrolyte membrane of the hydration sensor apparatus is exposed to a fuel exhaust stream of the fuel cell stack.

In another further embodiment, the sensor of the hydration sensor apparatus is fluidly connected to an anode inlet port of the fuel cell stack such that, during operation of the fuel cell system, the polymer electrolyte membrane of the hydration sensor apparatus is exposed to a fuel inlet stream of the fuel cell stack.

In yet another further embodiment, (1) the fuel cell stack comprises a plurality of fuel cells, each fuel cell having an anode and an anode flow field plate having at least one anode flow field channel formed on the surface thereof, and (2) the sensor of the hydration sensor apparatus is disposed between the anode and the anode flow field plate of one of the plurality of fuel cells of the fuel cell stack such that, during operation of the fuel cell system, the polymer electrolyte membrane of the hydration sensor apparatus is exposed to an internal fuel stream of the fuel cell stack. The sensor of the hydration sensor apparatus may have a surface area equal to the surface area of the anode of the fuel cell or the sensor of the hydration sensor apparatus may have a smaller surface area than the surface area of the anode of the fuel cell.

In other embodiments, the fuel cell system may comprise more than one hydration sensor apparatus. In such an embodiment, for example, the sensor of each of the more than one hydration sensor apparatuses may disposed between the anode and the anode flow field plate of one of a plurality of fuel cells of the fuel cell stack such that, during operation of the fuel cell system, the polymer electrolyte membrane of each hydration sensor apparatus is exposed to an internal fuel stream of the fuel cell stack.

In other embodiments, the sensor of the hydration sensor apparatus may further comprise (1) a first electrically insulating layer, and (2) a second electrically insulating layer, wherein the first and second electrically insulating layers are disposed on opposing sides of the polymer electrolyte membrane. The first and second electrically insulating layers may be perforated (e.g., perforated Kapton foil). In yet other embodiments, the polymer electrolyte membrane may be porous.

In a first more specific embodiment, the polymer electrolyte membrane of the hydration sensor apparatus is a catalyst-coated membrane, the catalyst-coated membrane comprising a polymer electrolyte membrane, a first electrocatalyst layer and a second electrocatalyst layer.

In various further embodiments of the foregoing, the first and second electrocatalyst layers of the hydration sensor apparatus may be uniformly deposited on opposing surfaces of the polymer electrolyte membrane of the hydration sensor apparatus, or the first and second electrocatalyst layers of the hydration sensor apparatus may be selectively deposited on opposing surfaces of the polymer electrolyte membrane of the hydration sensor apparatus such that the first and second electrocatalyst layers are not directly opposite each other.

In other various further embodiments of the foregoing, the sensor of the hydration sensor apparatus further comprises a first gas diffusion layer disposed on one side of the catalyst-coated membrane of the sensor. The sensor of the hydration sensor apparatus may also further comprises a second gas diffusion layer disposed on the other side of the catalyst-coated membrane of the sensor opposite the first gas diffusion layer. In addition, the hydration sensor apparatus may further comprise (1) a first electrically insulated conductive wire electrically connected to the first gas diffusion layer of the sensor, and (2) a second electrically insulated conductive wire electrically connected to the catalyst-coated membrane of the sensor, wherein the sensor of the hydration sensor apparatus is electrically connected to the power supply and the load resistor of the hydration sensor apparatus through the first and second electrically insulated conductive wires. The first and second electrically insulated conductive wires may be platinum.

In yet other various further embodiments of the foregoing, the sensor of the hydration sensor apparatus further comprises (1) a first electrically conductive layer disposed on one side of the catalyst-coated membrane of the sensor, and (2) a second electrically conductive layer disposed on the other side of the catalyst-coated membrane of the sensor opposite the first electrically conductive layer, wherein the first and second electrically conductive layers are electrically insulated from each other, and wherein the sensor of the hydration sensor apparatus is electrically connected to the power supply and the load resistor of the hydration sensor apparatus through the first and second electrically conductive layers. The first and second electrically conductive layers may be gas diffusion layers or perforated platinum foil layers.

In yet other various further embodiments of the foregoing, the first and second electrocatalyst layers may be porous.

In a second more specific embodiment, the polymer electrolyte membrane is a proton-exchange membrane.

In various further embodiments of the foregoing, the hydration sensor apparatus further comprises (1) a first electrically insulated platinum wire electrically connected to the proton-exchange membrane of the sensor, and (2) a second electrically insulated platinum wire electrically connected to the proton-exchange membrane of the sensor, wherein the sensor of the hydration sensor apparatus is electrically connected to the power supply and the load resistor of the hydration sensor apparatus through the first and second electrically insulated platinum wires. The first and second electrically insulated platinum wires may be partially embedded in the proton-exchange membrane, in opposing sides of the proton-exchange membrane or in the same side of the proton-exchange membrane. Alternatively, the sensor of the hydration sensor apparatus may further comprise (1) a first electrically insulating layer, and (2) a second electrically insulating layer, wherein the first and second electrically insulating layers are disposed on opposing sides of the proton-exchange membrane, and wherein the first and second electrically insulated platinum wires are partially embedded in at least one of the first and second electrically insulating layers.

In other various further embodiments of the foregoing, the hydration sensor apparatus further comprises (1) a first electrically insulated conductive wire electrically connected to the proton-exchange membrane of the sensor through a first catalyst contact, and (2) a second electrically insulated conductive wire electrically connected to the proton-exchange membrane of the sensor through a second catalyst contact, wherein the sensor of the hydration sensor apparatus is electrically connected to the power supply and the load resistor of the hydration sensor apparatus through the first and second electrically insulated conductive wires. The first and second electrically insulated conductive wires may be electrically connected to the proton-exchange membrane on the same side of the proton-exchange membrane or on opposing sides of the proton-exchange membrane. Alternatively, the first electrically insulated conductive wire may be electrically connected to the proton-exchange membrane of the sensor through a catalyst layer deposited on one side of the proton-exchange membrane, and the second electrically insulated conductive wire may be electrically connected to the proton-exchange membrane of the sensor through the catalyst layer, such that the first and second electrically insulated conductive wires are electrically connected to the proton-exchange membrane on the same side of the proton-exchange membrane.

These and other aspects of the invention will be evident upon reference to the following detailed description and attached drawings.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
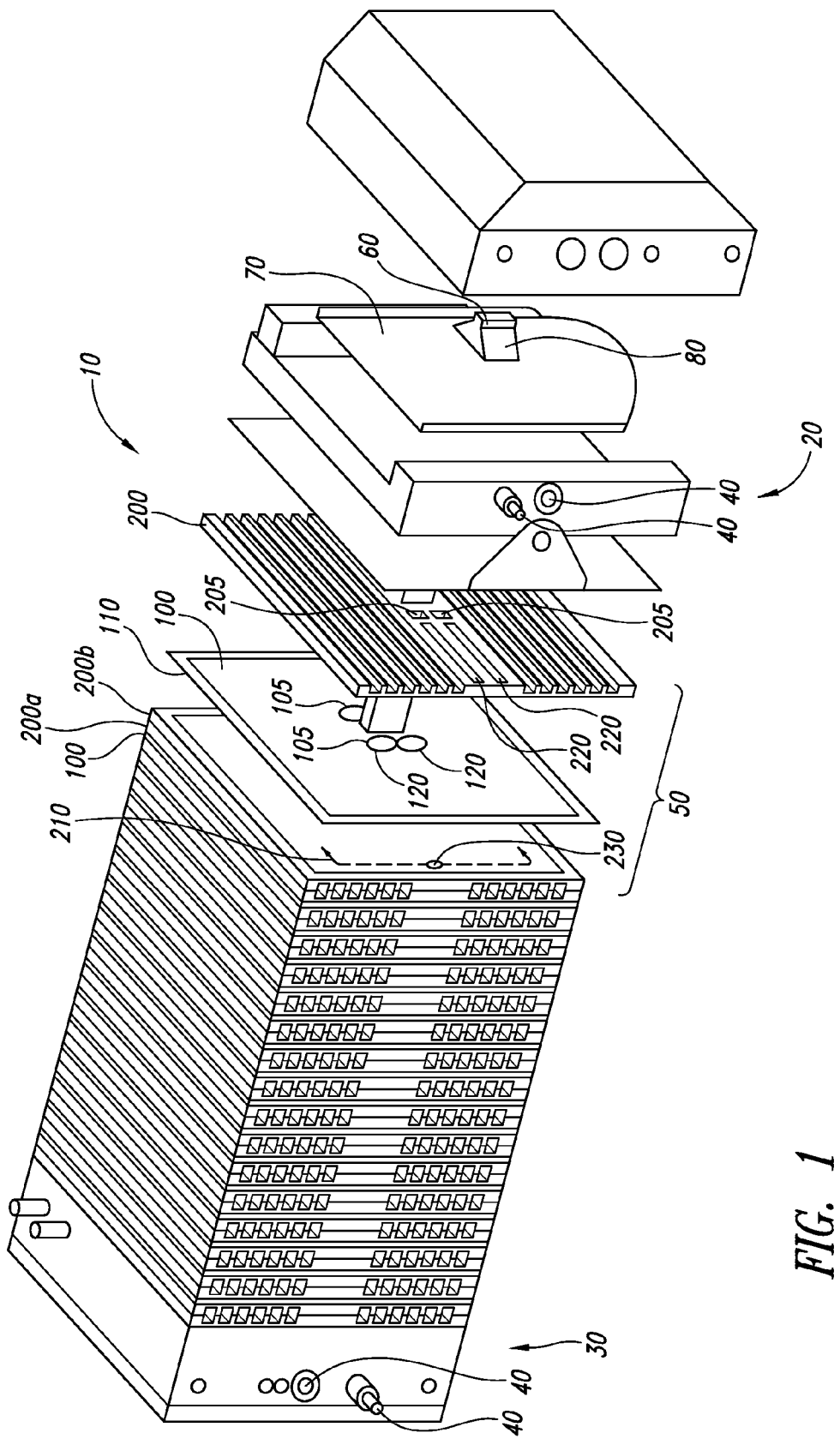
FIG. 1 is a partially exploded perspective view of a representative electrochemical fuel cell stack.

FIG. 1 illustrates a representative electrochemical fuel cell stack 10, including a pair of end plate assemblies 20 and 30, and a plurality of stacked fuel cells 50, each comprising a membrane electrode assembly (MEA) 100, and a pair of separator plates 200. Between each adjacent pair of MEAs 100 in the stack, there are two separator plates 200 which have adjoining surfaces. An adjoining pair of separator plates are shown as 200a and 200b. A tension member 60 extends between end plate assemblies 20 and 30 to retain and secure stack 10 in its assembled state. Spring 70 with clamping members 80 grip an end of tension member 60 to apply a compressive force to fuel cells 50 of stack 10.

Fluid reactant streams are supplied to and exhausted from internal manifolds and passages in stack 10 via inlet and outlet ports 40 in end plate assemblies 20 and 30. Aligned internal reactant manifold openings 105 and 205 in MEAs 100 and separator plates 200, respectively, form internal reactant manifolds extending through stack 10.

In the illustrated embodiment, perimeter seal 110 is provided around the outer edge of both sides of MEA 100. Manifold seals 120 circumscribe internal reactant manifold openings 105 on both sides of MEA 100. When stack 10 is secured in its assembled, compressed state, seals 110 and 120 cooperate with the adjacent pair of plates 200 to fluidly isolate fuel and oxidant reactant streams in internal reactant manifolds and passages, thereby isolating one reactant stream from the other and preventing the streams from leaking from stack 10.

As illustrated in FIG. 1, each MEA 100 is positioned between the active surfaces of two separator plates 200. Each separator plate 200 has flow field channels 210 (partially shown) on the active surface thereof (which contacts the MEA) for distributing fuel or oxidant fluid streams to the active area of the contacted electrode of the MEA 100. In the embodiment illustrated in FIG. 1, flow field channels 210 on the active surface of plates 200 are fluidly connected to internal reactant manifold openings 205 in plate 200 via supply/exhaust passageways comprising backfeed channels 220 (partially shown) located on the non-active surface of separator plate 200 and ports 230 extending through (i.e., penetrating the thickness) of plate 200. One end of port 230 is open to the active area of separator plate 200 and the other end of port 230 is open to backfeed channels 220.

Figure 2:
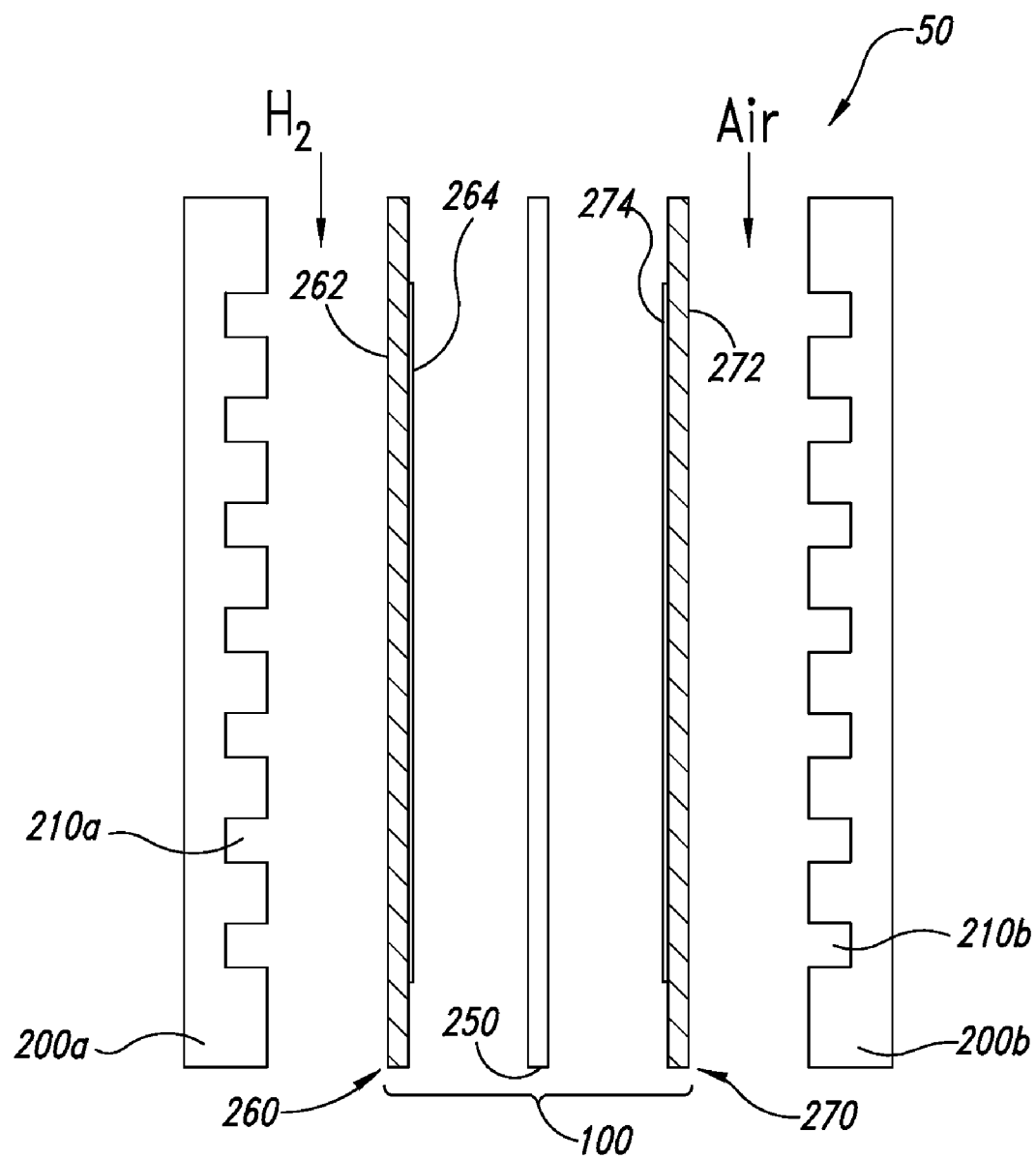
FIG. 2 is an exploded sectional view of a representative electrochemical fuel cell.

FIG. 2 is an exploded sectional view of a representative electrochemical fuel cell 50. Fuel cell 50 includes a MEA 100 interposed between anode flow field plate 200a and cathode flow field plate 200b. MEA 100 comprises a polymer electrolyte membrane 250 interposed between two electrodes, namely, anode 260 and cathode 270. In conventional fuel cells, anode 260 and cathode 270 each comprise a gas diffusion layer (i.e., a fluid distribution layer of porous electrically conductive sheet material) 262 and 272, respectively. Each fluid distribution layer has a thin layer of electrocatalyst 264 and 274, such as platinum black or a carbon-supported platinum catalyst, disposed on the surface thereof at the interface with membrane 250 to render each electrode electrochemically active. Anode flow field plate 200*a* has at least one anode flow field channel 210*a* formed in its surface facing anode fluid distribution layer 262. Similarly, cathode flow field plate 200*b* has at least one cathode flow field channel 210*b* formed in its surface facing cathode fluid distribution layer 272. When assembled against the cooperating surfaces of fluid distribution layers 262 and 272, channels 210*a* and 219*b* form reactant flow field passages for the fuel and oxidant, respectively, or the fuel and the oxidant/coolant, respectively, in a combined oxidant-coolant fuel cell.

As described above with respect to FIG. 1, in a representative fuel cell stack, a plurality of fuel cells 50 are arranged in series, such that, with respect to a single fuel cell 50, anode flow field plate 200*a* is adjacent to the cathode flow field plate 200*b* of one of the two adjacent fuel cells 50 and cathode flow field plate 200*b* is adjacent to the anode flow field plate 200*a* of the other adjacent fuel cell 50 (i.e., anode 260 faces the cathode 270 of one adjacent fuel cell 50 and cathode 270 faces the anode 260 of the other adjacent fuel cell 50). Alternatively, rather than having two flow field plates between adjacent membrane electrode assemblies 100, the fuel cell stack may comprise a plurality of bipolar flow field plates (not shown) between adjacent membrane electrode assemblies 100. In such stacks, channels on one side of the bipolar flow field plate function as the anode flow field channels for, and carry fuel to, the anode 260 of one of the adjacent membrane electrode assemblies 100, while channels on the other side of the plate serve as the cathode flow field channels for, and carry oxidant to, the cathode 270 of the other adjacent membrane electrode assembly 100. In both configurations, the flow field plates are electrically conductive and cooperate with the electrically conductive fluid distribution layers to conduct current through the fuel cell stack.

As noted above, the present invention relates to a fuel cell system comprising a fuel cell stack, such as those described above, and at least one hydration sensor apparatus for measuring membrane hydration in the fuel cell stack. The hydration sensor apparatus of the present invention is based on the use of a sensor comprising a "test" membrane electrode assembly (or, as described in more detail below, a catalyst-coated or proton-exchange membrane) as a hydrogen pump at any point in the fuel fluid stream of the fuel cell stack where the level of membrane hydration (or the relative humidity of the fuel fluid stream) is of interest. Furthermore, based upon experiments showing that the relative humidity within a fuel cell does not vary significantly in the direction perpendicular to the plane of the membrane, a sensor placed within a fuel cell may be used to determine the local hydration level of the membrane.

The test MEA operates as a hydrogen pump (i.e., hydrogen is pumped through the MEA) when the MEA is exposed to hydrogen, or a hydrogen-containing fuel, on both sides and a voltage is applied to the test MEA. On the first electrode side, hydrogen is electrochemically converted into protons and electrons. The protons produced on the first electrode side then flow through the membrane and react with electrons (which have traveled from the first electrode side to the second electrode side through an external circuit) on the second electrode side to form hydrogen.

The resistance of the test MEA varies with the level of hydration of the membrane, and the level of hydration of the membrane is dependent on the relative humidity and temperature of the membrane's environment. In this way, at a given temperature, the membrane acts as a variable resistor, the resistance of which is a function of relative humidity. Thus, given a constant voltage (or power) source, a constant load resistance and a constant supply of fuel, any variability in the current flowing through a circuit comprising the test MEA can be attributed to the resistance of the membrane of the test MEA. Accordingly, the current flowing through such a circuit is indicative of the relative humidity and temperature of the environment in which the membrane of the test MEA is submersed. For example, a high current would correspond to a low membrane resistance and a high relative humidity, and a low current would correspond to a high membrane resistance and a low relative humidity. Alternatively, given a constant current, a constant load resistance and a constant supply of fuel, any variability in the voltage of the circuit comprising the test MEA can be attributed to the resistance of the membrane of the test MEA.

The current and voltage of the test MEA may be measured using either a two-point or four-point voltage measurement method. Such measurement methods are well known to those of ordinary skill in the art and, therefore, need not be discussed in further detail. As one of skill in the art will appreciate, utilizing a four-point voltage measurement method would improve the accuracy of the measurements.

A sensor comprising a test MEA may be placed at any point in the fuel fluid stream of the fuel cell stack where the level of membrane hydration (or the relative humidity of the fuel fluid stream) is of interest. For example, and as further described with respect to FIGS. 4A and 4B below, a sensor may be fluidly connected to an anode port of a fuel cell stack such that, during operation of the fuel cell stack, both the first and second electrodes of the sensor are exposed to a fuel inlet, or outlet, stream of the fuel cell stack. In other embodiments, as described with respect to FIGS. 5 through 8 below, a sensor may be disposed between the anode and the anode flow field plate of a fuel cell within a fuel cell stack such that, during operation of the fuel cell stack, both the first and second electrodes of the sensor are exposed to an internal fuel stream of the fuel cell stack.

Furthermore, since a test MEA acts as a hydrogen pump, the current flowing through a circuit comprising a test MEA would be dependent on the supply of fuel. Thus, a test MEA could also be utilized to detect fuel starvation conditions and/or the hydrogen concentration in the fuel supply.

Figure 3:
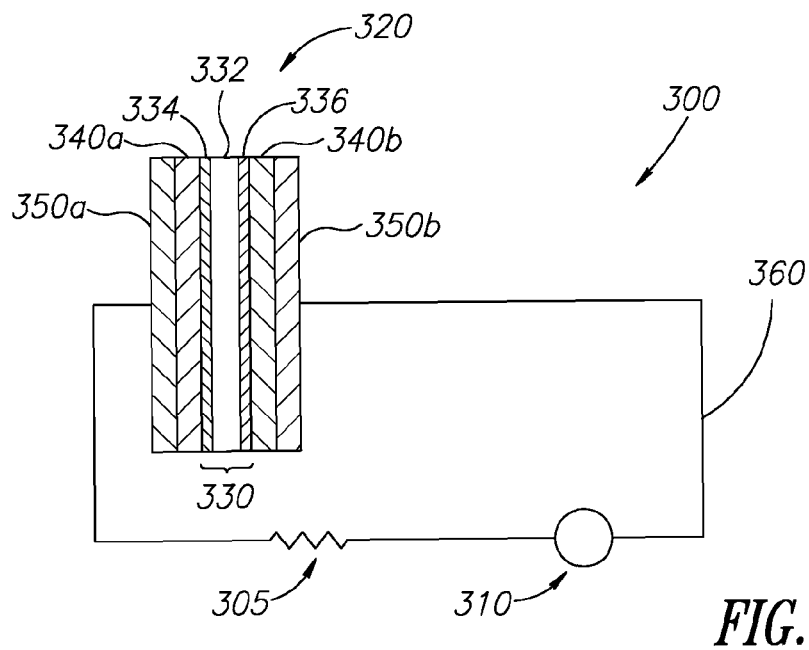
FIG. 3 is a diagram of a representative hydration sensor apparatus.

FIG. 3 illustrates a representative hydration sensor apparatus 300. As shown, hydration sensor apparatus 300 comprises a sensor 320, a power supply 310 and a load resistor 305, all of which are electrically connected in series. Sensor 320 further comprises a catalyst-coated membrane 330, which comprises a polymer electrolyte membrane 332 coated on opposing surfaces thereof with a first electrocatalyst layer 334 and a second electrocatalyst layer 336. In addition, in the illustrated embodiment, sensor 320 further comprises a first gas diffusion layer 340*a* and a second gas diffusion layer 340*b*, adjacent to first and second electrocatalyst layers 334, 336, respectively. Sensor 320 is electrically connected to power supply 310 and load resistor 305 through electrically insulated conductive wires 360, which can be made of platinum or any other electrically conductive material compatible with the fuel cell environment. As further shown, sensor 320 comprises first and second electrically insulating layers 350*a*, 350*b*, respectively, which may be made of Kapton® or any other electrically insulating material compatible with the fuel cell environment that is gas permeable in both the in-plane and through-plane directions. As one of skill in the art will appreciate, first and second electrically insulating layers 350a, 350b may be perforated to enhance their gas permeability. As further discussed below, in alternate embodiments of representative hydration sensor apparaturs 300, first and second electrocatalyst layers 334, 336 may be replaced by platinum wires in direct contact with polymer electrolyte membrane 332. Furthermore, and as further discussed below, first and second gas diffusion layers are not required and may not be present in various embodiments of representative hydration sensor apparatus 300.

In operation, sensor 320 is fluidly connected to a fuel cell stack, such that both first and second electrocatalyst layers 334, 336 are exposed to a fuel fluid stream of the fuel cell stack. Power supply 310 is used to operate sensor 320 as a hydrogen pump and load resistor 305 is used to both (1) limit the current through the circuit comprising sensor 320, power supply 310 and load resistor 305, and (2) measure the amount of current by monitoring the voltage drop across load resistor 305.

In the illustrated embodiment, first and second electrocatalyst layers 334, 336 layers are uniformly deposited on opposing surfaces of polymer electrolyte membrane 332. However, in alternate embodiments, first and second electrocatalyst layers 334, 336 may be selectively deposited on opposing surfaces of polymer electrolyte membrane 332 such that first and second electrocatalyst layers 334, 336 are not directly opposite each other. For example, first and second electrocatalyst layers 334, 336 may be deposited at opposite ends of polymer electrolyte membrane 332 and/or at opposite corners of polymer electrolyte membrane 332. In such an embodiment, protons will not only have to travel across the plane of polymer electrolyte membrane 332, but will also have to travel through, or within, the plane of polymer electrolyte membrane 332. This increased distance will increase the voltage drop across the membrane, thereby making the detection of resistance variation of the test MEA easier to detect.

In addition, in various embodiments, polymer electrolyte membrane 332 may be formed from a porous material, such as ePTFE (expanded polytetrafluoroethylene) with a lower Nafion® content or a Ti-Nafion® mixture, which is permeable to impurities such as nitrogen and prevents such impurities from accumulating on the face of the membrane. Such a permeable membrane may be advantageously employed in fuel cell systems utilizing a hydrogen-containing reformate stream, which typically comprises higher impurity levels. Similarly, in various embodiments, first and second electrocatalyst layers 334, 336 may be porous.

Figure 4A:
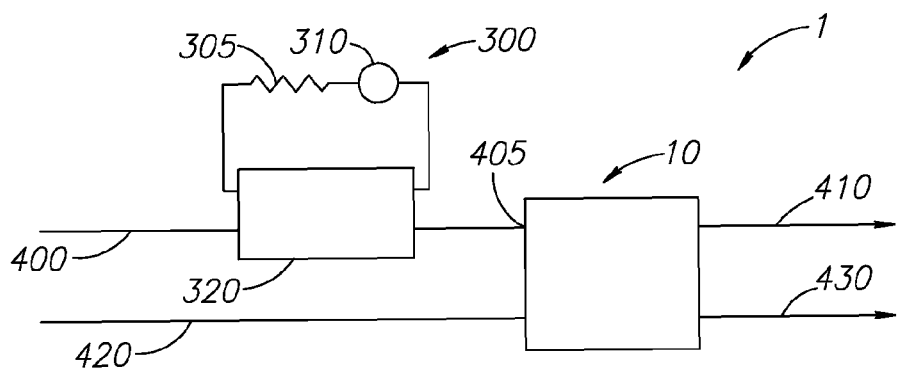
FIGS. 4A and 4B are diagrams of representative fuel cell systems comprising a fuel cell stack and a hydration sensor apparatus fluidly connected to an anode port of the fuel cell stack.

FIG. 4A illustrates a representative fuel cell system 1 comprising a hydration sensor apparatus 300, as described above with respect to FIG. 3, fluidly connected to an anode inlet port 405 of a fuel cell stack 10. Hydration sensor apparatus 300 comprises a sensor 320, load resistor 305 and power supply 310. As described above with respect to FIG. 3, sensor 320 further comprises a catalyst-coated membrane having a polymer electrolyte membrane, a first electrocatalyst layer and a second electrocatalyst layer (not specifically shown). FIG. 4A further shows a fuel inlet stream 400, a fuel exhaust stream 410, an oxidant inlet stream 420 and an oxidant exhaust stream 430 of fuel cell stack 10. As shown, sensor 320 of hydration sensor apparatus 300 is fluidly connected to anode inlet port 405 of fuel cell stack 10 such that, during operation, both the first and second electrocatalyst layers of hydration sensor apparatus 300 are exposed to fuel inlet stream 400.

Figure 4B:
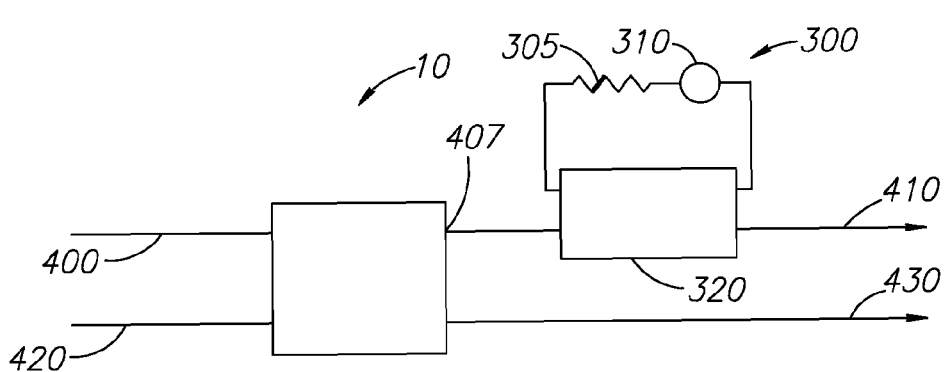

Similar to FIG. 4A, FIG. 4B illustrates a representative fuel cell system 1 comprising a hydration sensor apparatus 300, as described above with respect to FIG. 3, fluidly connected to an anode outlet port 407 of a fuel cell stack 10. Hydration sensor apparatus 300 comprises a sensor 320, load resistor 305 and power supply 310. As described above with respect to FIG. 3, sensor 320 further comprises a catalyst-coated membrane having a polymer electrolyte membrane, a first electrocatalyst layer and a second electrocatalyst layer (not specifically shown). FIG. 4B further shows a fuel inlet stream 400, a fuel exhaust stream 410, an oxidant inlet stream 420 and an oxidant exhaust stream 430 of fuel cell stack 10. As shown, sensor 320 of hydration sensor apparatus 300 is fluidly connected to anode outlet port 407 of fuel cell stack 10 such that, during operation, both the first and second electrocatalyt layers of hydration sensor apparatus 300 are exposed to fuel outlet stream 410.

As described above with respect to FIG. 3, in various embodiments of the hydration sensor apparatus 300 of FIGS. 4A and 4B, sensor 320 may further comprise a first gas diffusion layer and/or a second gas diffusion layer. In addition, as described above, in various embodiments, the first and second electrocatalyst layers of sensor 320 may be uniformly deposited on opposing surfaces of the polymer electrolyte membrane or the first and second electrocatalyst layers may be selectively deposed on opposing surfaces of the polymer electrolyte membrane such that the first and second electrocatalyst layers are not directly opposite each other. Furthermore, as described above, in various embodiments, the polymer electrolyte membrane and the first and second electrocatalyst layers of sensor 320 may be formed from a porous material. Furthermore, as described above and below, in various embodiments, the first and second electrocatalyst layers may be replaced by platinum wires in direct contact with the polymer electrolyte membrane. As one of ordinary skill in the art will appreciate, the further embodiments of sensor 320 described below in reference to FIGS. 5 through 8 may be utilized in the hydration sensor apparatus 300 of FIGS. 4A and 4B.

Figure 5:
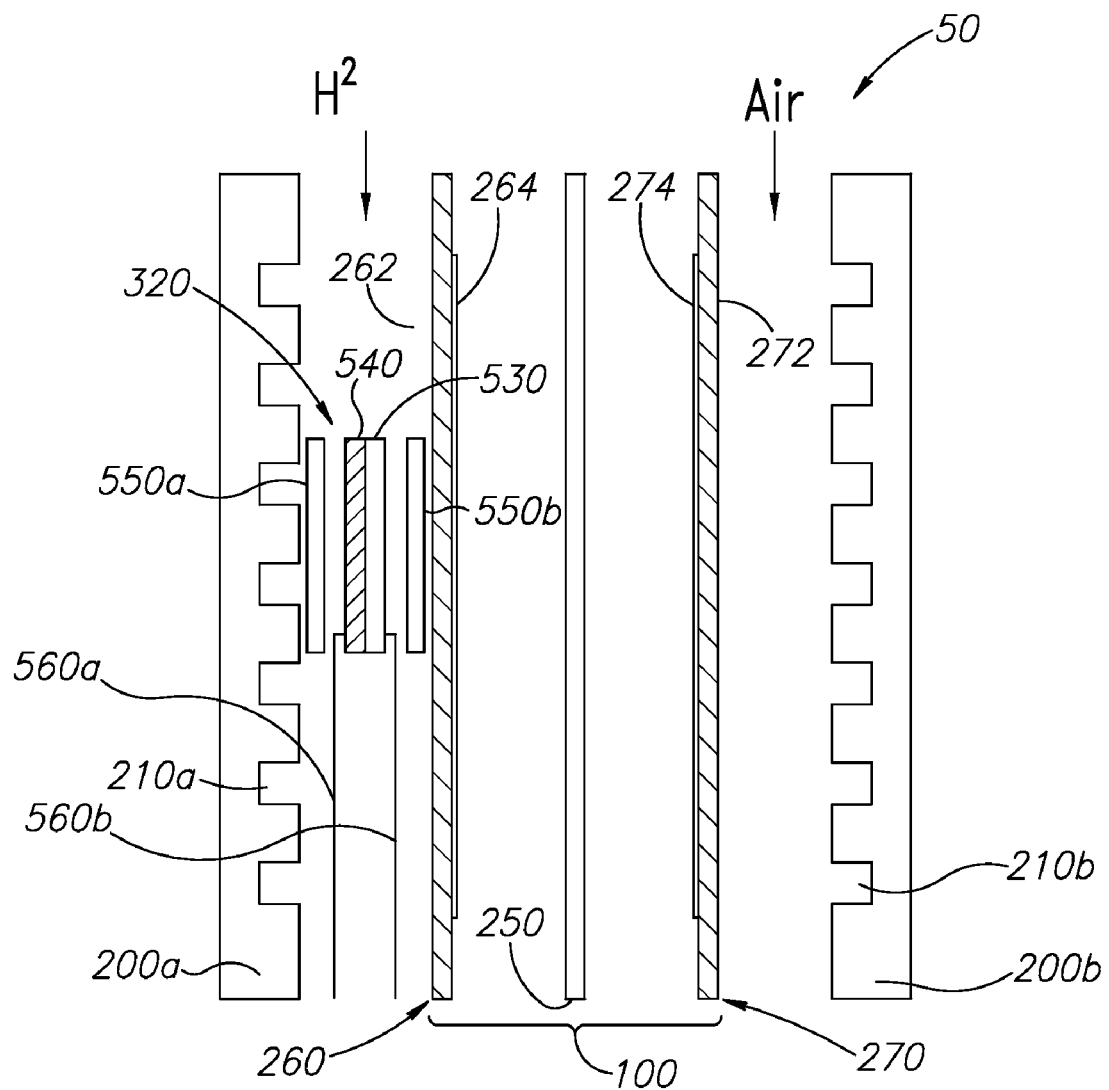
FIG. 5 is an exploded sectional view of one embodiment of a representative sensor of a hydration sensor apparatus disposed between the anode and the anode flow field plate of a fuel cell.

FIG. 5 is an exploded sectional view of one embodiment of a representative sensor 320 of a hydration sensor apparatus disposed between the anode 260 and the anode flow field plate 200a of a fuel cell 50. As described above with respect to FIG. 2, fuel cell 50 includes a MEA 100 interposed between an anode flow field plate 200a and a cathode flow field plate 200b. MEA 100 comprises a polymer electrolyte membrane 250 interposed between two electrodes, namely, anode 260 and cathode 270, and anode 260 and cathode 270 each comprise a gas diffusion layer 262 and 272, respectively, and an electrocatalyst layer 264 and 274, respectively. Anode flow field plate 200a has at least one anode flow field channel 210a formed in its surface facing anode fluid distribution layer 262. Similarly, cathode flow field plate 200b has at least one cathode flow field channel 210b formed in its surface facing cathode fluid distribution layer 272. When assembled against the cooperating surfaces of fluid distribution layers 262 and 272, channels 210a and 210b form reactant flow field passages for the internal fuel and oxidant streams (represented by two labeled arrows in FIG. 5).

As shown in FIG. 5, sensor 320 comprises a catalyst-coated membrane 530 having a polymer electrolyte membrane, a first electrocatalyst layer and a second electrocatalyst layer (not specifically shown). Sensor 320 further comprises a first gas diffusion layer 540 disposed between catalyst-coated membrane 530 and anode flow field plate 200a of fuel cell 50, a first electrically insulating layer 550a disposed between first gas diffusion layer 540 and anode flow field plate 550, and a second electrically insulating layer 550b disposed between catalyst-coated membrane 530 and anode 260. First and second electrically insulating layers 550*a*, 550*b* allow access of the internal fuel stream to first gas diffusion layer 540 and catalyst-coated membrane 530, respectively, and electrically insulate sensor 320 from anode flow field plate 200*a* and anode 260, respectively. First and second electrically insulating layers may be formed from, for example, a perforated Kapton® sheet or any other electrically insulating material compatible with the fuel cell environment. Sensor 320 is electrically connected to the load resistor and power supply (not shown) of the hydration sensor apparatus through a first electrically insulated conductive wire 560*a*, having a first end electrically connected to first gas diffusion layer 540, and a second electrically insulated conductive wire 560*b*, having a first end electrically connected to catalyst-coated membrane 530. Electrically insulated conductive wires 560*a*, 560*b* can be made of platinum or any other electrically conductive material compatible with the fuel cell environment.

In the illustrated embodiment, sensor 320 has a smaller surface area than the surface area of anode 260 of fuel cell 50. As one of ordinary skill in the art will appreciate, the size of sensor 320 may vary, and, while in some cases a very small size is preferable, in alternate embodiments, sensor 320 may have a surface area equal to the surface area of anode 260 of fuel cell 50.

As described above with respect to FIG. 3, in various embodiments of the sensor 320 of FIG. 5, sensor 320 may further comprise a second gas diffusion layer disposed between catalyst-coated membrane 530 and anode 260. In addition, as described above, in various embodiments, the first and second electrocatalyst layers of sensor 320 may be uniformly deposited on opposing surfaces of the polymer electrolyte membrane of sensor 320 or the first and second electrocatalyst layers may be selectively deposited on opposing surfaces of the polymer electrolyte membrane such that the first and second electrocatalyst layers are not directly opposite each other. Furthermore, as described above, in various embodiments, the polymer electrolyte membrane and the first and second electrocatalyst layers of sensor 320 may be formed from a porous material. Furthermore, as described above and below, in various embodiments, the first and second electrocatalyst layers may be replaced by platinum wires in direct contact with the polymer electrolyte membrane.

Figure 6:
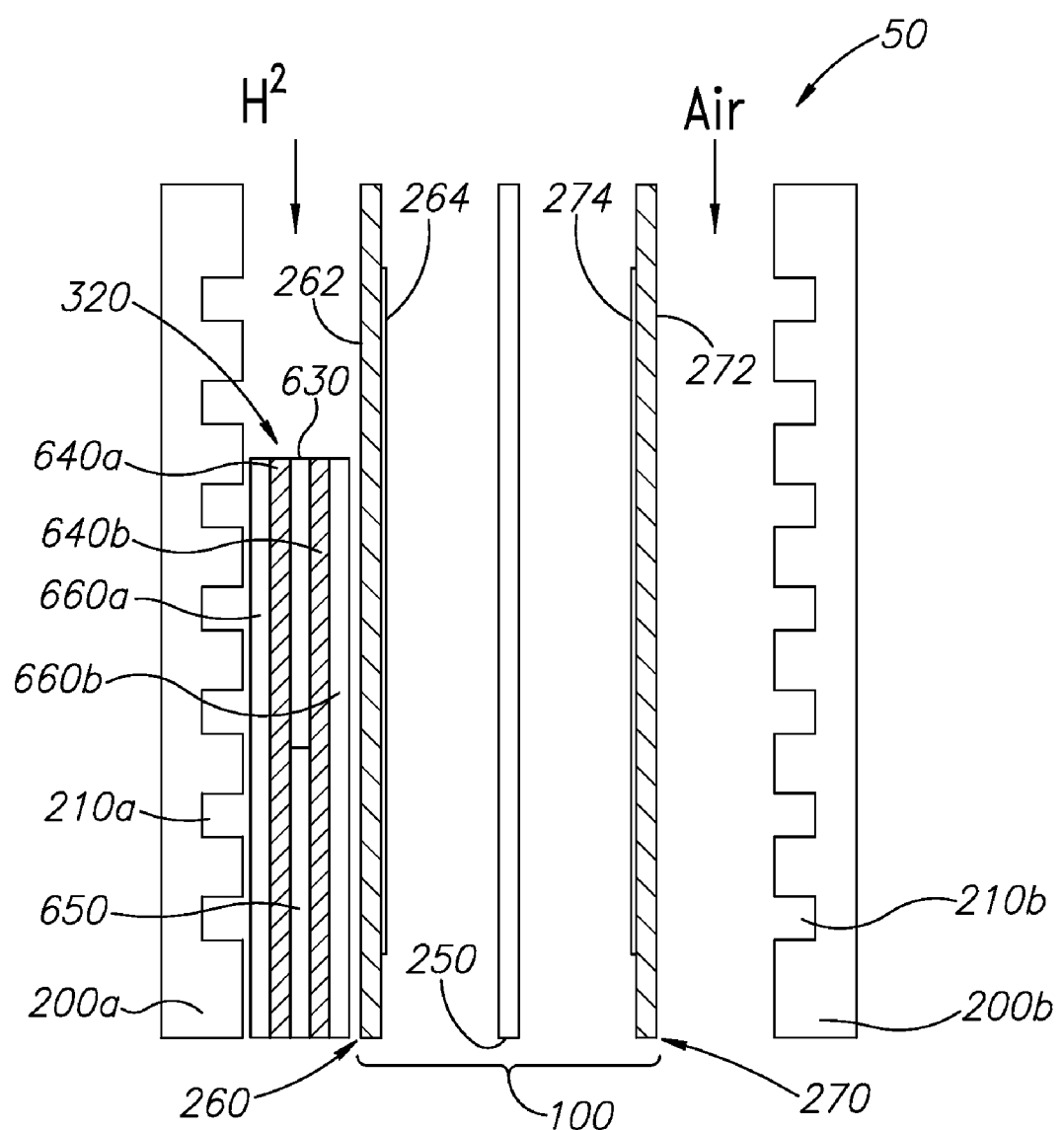
FIG. 6 is an exploded sectional view of a second embodiment of a representative sensor of a hydration sensor apparatus disposed between the anode and the anode flow field plate of a fuel cell.

FIG. 6 is an exploded sectional view of a second embodiment of a representative sensor 320 of a hydration sensor apparatus disposed between the anode 260 and the anode flow field plate 200*a* of a fuel cell 50. As described above with respect to FIGS. 2 and 5, fuel cell 50 includes a MEA 100 interposed between an anode flow field plate 200*a* and a cathode flow field plate 200*b*. MEA 100 comprises a polymer electrolyte membrane 250 interposed between two electrodes, namely, anode 260 and cathode 270, and anode 260 and cathode 270 each comprise a gas diffusion layer 262 and 272, respectively, and an electrocatalyst layer 264 and 274, respectively. Anode flow field plate 200*a* has at least one anode flow field channel 210*a* formed in its surface facing anode fluid distribution layer 262. Similarly, cathode flow field plate 200*b* has at least one cathode flow field channel 210*b* formed in its surface facing cathode fluid distribution layer 272. When assembled against the cooperating surfaces of fluid distribution layers 262 and 272, channels 210*a* and 210*b* form reactant flow field passages for the internal fuel and oxidant streams (represented by two labeled arrows in FIG. 6).

As shown in FIG. 6, sensor 320 comprises a catalyst-coated membrane 630 having a polymer electrolyte membrane, a first electrocatalyst layer and a second electrocatalyst layer (not specifically shown). Sensor 320 further comprises (1) a first electrically conductive layer 640*a* disposed between catalyst-coated membrane 630 and anode flow field plate 200*a*, (2) a second electrically conductive layer 640*b* disposed between catalyst-coated membrane 630 and anode 260 of fuel cell 50, (3) a first electrically insulating layer 660*a* disposed between first electrically conductive layer 640*a* and anode flow field plate 200*a*, and (4) a second electrically insulating layer 660*b* disposed between second electrically conductive layer 640*b* and anode 260 of fuel cell 50. First and second electrically insulating layers 660*a*, 660*b* allow access of the internal fuel stream to catalyst-coated membrane 630 and electrically insulate first and second electrically conductive layers 640*a*, 640*b* from anode flow field plate 200*a* and anode 260, respectively. First and second electrically insulating layers 660*a*, 660*b* may be formed from, for example, perforated Kapton® sheets or any other electrically insulating material compatible with the fuel cell environment. First and second electrically conductive layers 640*a*, 640*b* also allow access of the internal fuel stream to catalyst-coated membrane 630 and may be made from, for example, gas diffusion layers, perforated conductive foil layers, or any other electrically conductive material compatible with the fuel cell environment. Sensor 320 is electrically connected to the load resistor and power supply (not shown) of the hydration sensor apparatus through first and second electrically conductive layers 640*a*, 640*b*. In various embodiments, first and second electrically conductive layers 640*a*, 640*b* may be gas diffusion layers or perforated platinum foil layers.

As further shown in FIG. 6, sensor 320 may further comprise a third electrically insulating layer 650 disposed between first and second electrically conductive layers 640*a*, 640*b* to both electrically insulate first and second electrically conductive layers 640*a*, 640*b* from each other and to provide structural support for sensor 320.

As described above with respect to FIG. 5, in the illustrated embodiment, sensor 320 has a smaller surface area than the surface area of anode 260 of fuel cell 50. However, as one of ordinary skill in the art will appreciate, the size of sensor 320 may vary, and, in alternate embodiments, sensor 320 may have a surface area equal to the surface area of anode 260 of fuel cell 50. In addition, as described above, in various embodiments, the first and second electrocatalyst layers of sensor 320 may be uniformly deposited on opposing surfaces of the polymer electrolyte membrane of sensor 320 or the first and second electrocatalyst layers may be selectively deposited on opposing surfaces of the polymer electrolyte membrane such that the first and second electrocatalyst layers are not directly opposite each other. Furthermore, as described above, in various embodiments, the polymer electrolyte membrane and the first and second electrocatalyst layers of sensor 320 may be formed from a porous material.

Figure 7:
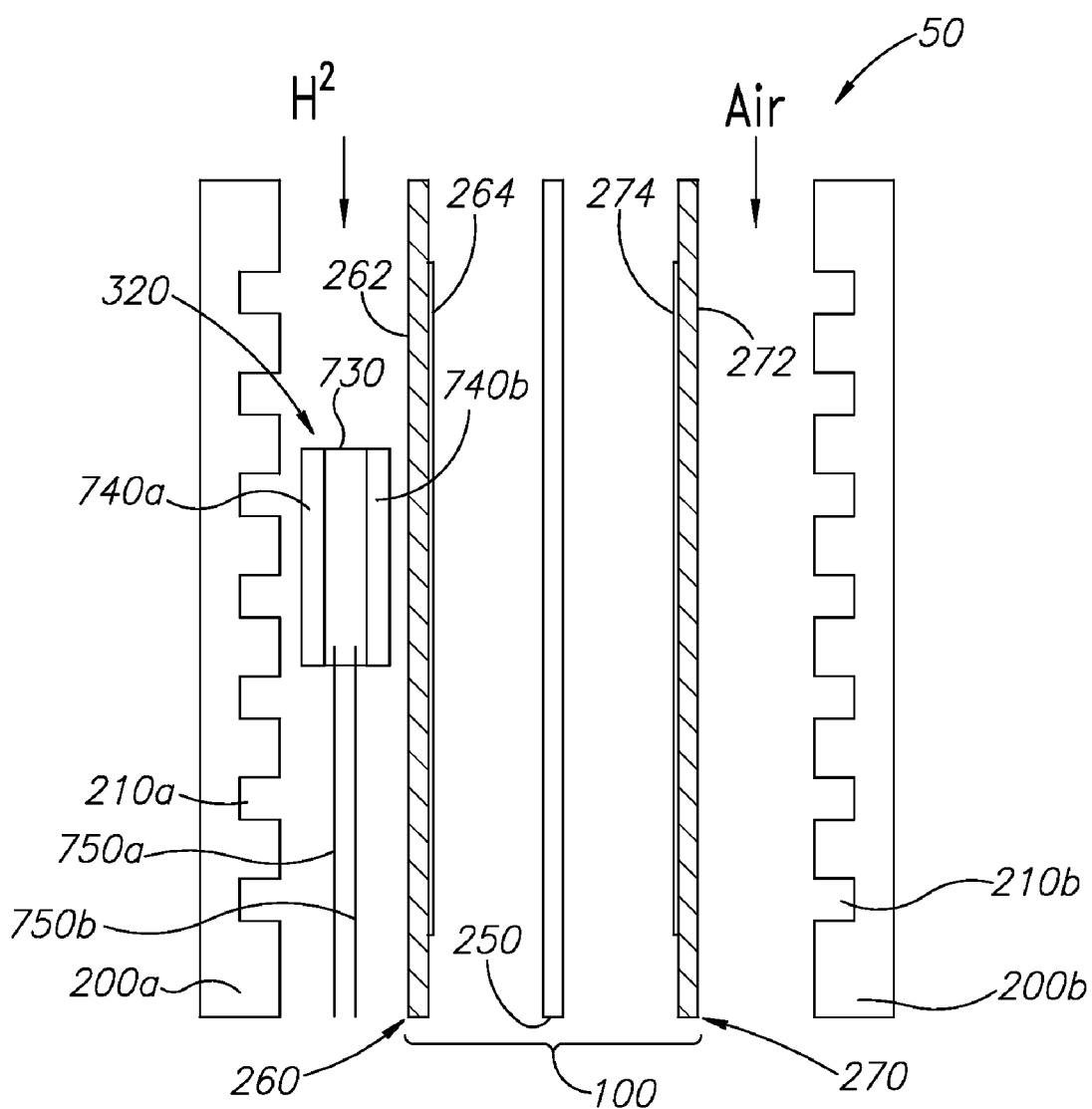
FIG. 7 is an exploded sectional view of a third embodiment of a representative sensor of a hydration sensor apparatus disposed between the anode and the anode flow field plate of a fuel cell.
Figure 8:
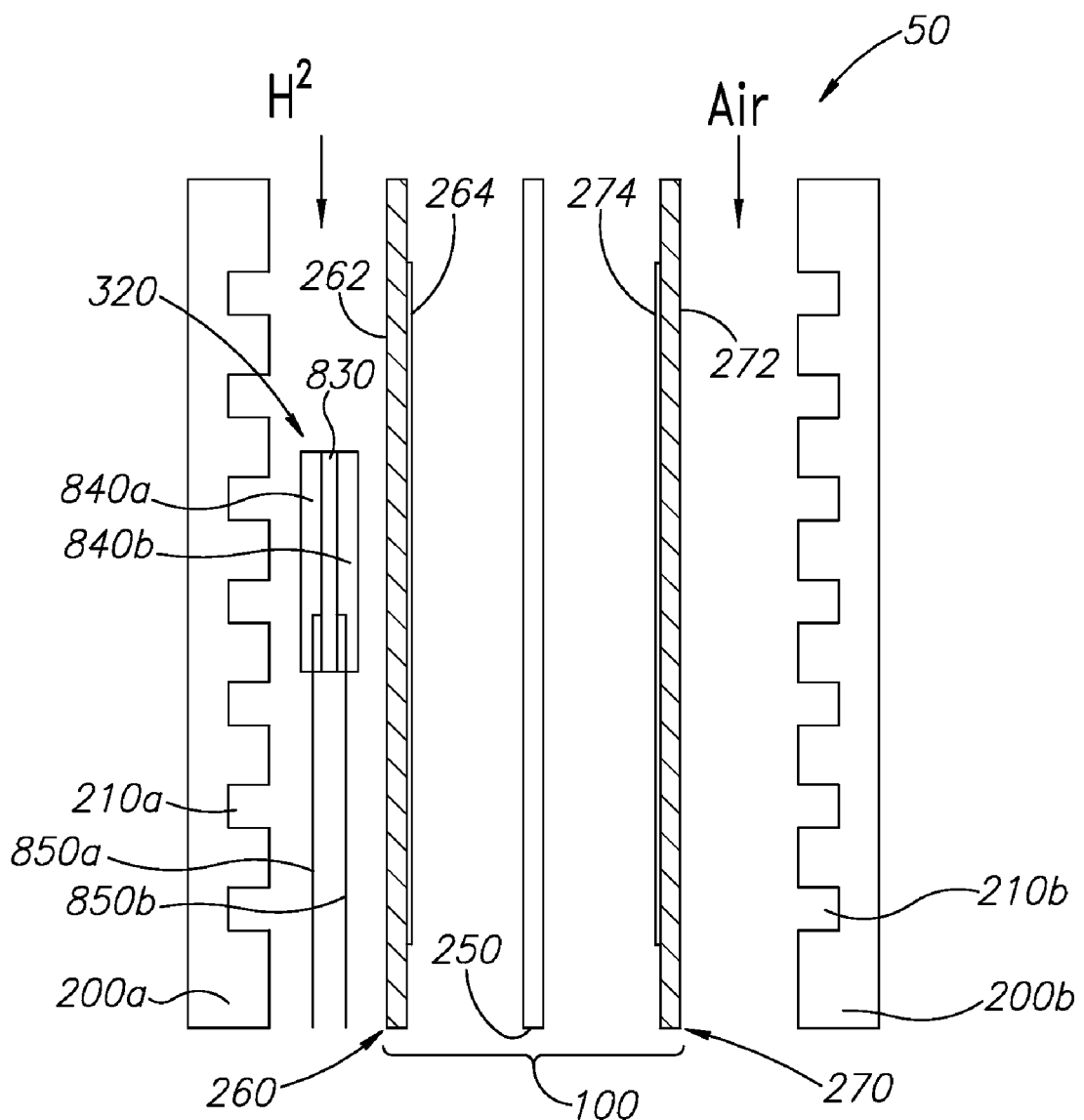
FIG. 8 is an exploded sectional view of a fourth embodiment of a representative sensor of a hydration sensor apparatus disposed between the anode and the anode flow field plate of a fuel cell.

FIGS. 7 and 8 are exploded sectional views of third and fourth embodiments of a representative sensor 320 of a hydration sensor apparatus disposed between the anode 260 and the anode flow field plate 200*a* of a fuel cell 50. As described above with respect to FIGS. 2, 5 and 6, and as shown in both FIGS. 7 and 8, fuel cell 50 includes a MEA 100 interposed between an anode flow field plate 200*a* and a cathode flow field plate 200*b*. MEA 100 comprises a polymer electrolyte membrane 250 interposed between two electrodes, namely, anode 260 and cathode 270, and anode 260 and cathode 270 each comprise a gas diffusion layer 262 and 272, respectively, and an electrocatalyst layer 264 and 274, respectively. Anode flow field plate 200*a* has at least one anode flow field channel 210*a* formed in its surface facing anode fluid distribution layer 262. Similarly, cathode flow field plate 200*b* has at least one cathode flow field channel 210*b* formed in its surface facing cathode fluid distribution layer 272. When assembled against the cooperating surfaces of fluid distribution layers 262 and 272, channels 210a and 210b form reactant flow field passages for the internal fuel and oxidant streams (represented by two labeled arrows in FIGS. 7 and 8).

In the embodiment shown in FIG. 7, sensor 320 comprises a proton-exchange membrane 730, which does not have first and second electrocatalyst layers similar to the catalyst-coated membranes described above. Sensor 320 further comprises a first electrically insulating layer 740a disposed between proton-exchange membrane 730 and anode flow field plate 200a of fuel cell 50 and a second electrically insulating layer 740b disposed between proton-exchange membrane 730 and anode 260 of fuel cell 50. First and second electrically insulating layers 740a, 740b allow access of the internal fuel stream to proton-exchange membrane 730 and electrically insulate sensor 320 from anode flow field plate 200a and anode 260, respectively. First and second electrically insulating layer may be formed from, for example, a perforated Kapton® sheet or any other electrically insulating material compatible with the fuel cell environment. As shown in FIG. 7, sensor 320 is electrically connected to the load resistor and power supply (not shown) of the hydration sensor apparatus through electrically insulated platinum wires 750a, 750b embedded in proton-exchange membrane 730.

In the embodiment shown in FIG. 8, sensor 320 comprises a proton-exchange membrane 830 similar to the embodiment of FIG. 7. Sensor 320 further comprises a first electrically insulating layer 840a disposed between proton-exchange membrane 830 and anode flow field plate 200a of fuel cell 50, and a second electrically insulating layer 840b disposed between proton-exchange membrane 830 and anode 260 of fuel cell 50. First and second electrically insulating layers 840a, 840b allow access of the internal fuel stream to proton-exchange membrane 830 and electrically insulate sensor 320 from anode flow field plate 200a and anode 260. First and second electrically insulating layers 840a, 840b may be formed from, for example, a perforated Kapton® sheet or any other electrically insulating material compatible with the fuel cell environment. As shown in FIG. 8, sensor 320 is electrically connected to the load resistor and power supply (not shown) of the hydration sensor apparatus through electrically insulated platinum wires 850a, 850b embedded in first and second electrically insulating layers 840a, 840b and in contact with proton-exchange membrane 830.

In the embodiments of FIGS. 7 and 8, and alternate embodiments of the sensors described above, wherein sensor 320 comprises a proton-exchange membrane in direct contact with electrically insulated platinum wires, the platinum wires facilitate the respective electrochemical reactions at the contact points between the platinum wires and the proton-exchange membrane. As one of ordinary skill in the art will appreciate, in alternate embodiments, wherein sensor 320 is electrically connected to the load resistor and power supply of the hydration sensor apparatus through electrically insulated conductive wires which are made of an electrically conductive material compatible with the fuel cell environment other than platinum, sensor 320 may comprise platinum or catalyst contacts (not specifically shown) at the point of contact between the electrically insulated conductive wires and the proton-exchange membrane. Alternatively, sensor 320 may comprise a proton-exchange membrane having a catalyst layer deposited on one side thereof (i.e., a one-sided catalyst-coated membrane), and the first and second electrically insulated conductive wires may be electrically connected to the proton-exchange membrane through this catalyst layer such that the first and second electrically insulated conductive wires are electrically connected to the proton-exchange membrane on the same side of the proton-exchange membrane.

As one of ordinary skill in the art will appreciate, various modifications may be made to the embodiments illustrated in FIGS. 7 and 8 without deviating from the spirit and scope of the invention. For example, as described above, in various embodiments, sensor 320 may further comprise first and/or second gas diffusion layers. In addition, in various embodiments, the electrically insulated conductive wires may be in contact with opposite sides, or the same side, of the proton-exchange membrane. Furthermore, in various embodiments, the electrically insulated conductive wires may be embedded in opposite sides, or the same side, of the proton-exchange membrane or in different, or the same, electrically insulating layer.

Although various embodiments have been described above, one of ordinary skill in the art will appreciate that many modifications may be made to the disclosed embodiments without deviating from the spirit and scope of the invention. Furthermore, more than one of the disclosed hydration sensor apparatuses may be placed at different locations within one fuel cell (to measure local MEA hydration levels), or within different fuel cells, of a fuel cell stack.

EXAMPLES

Figure 9:
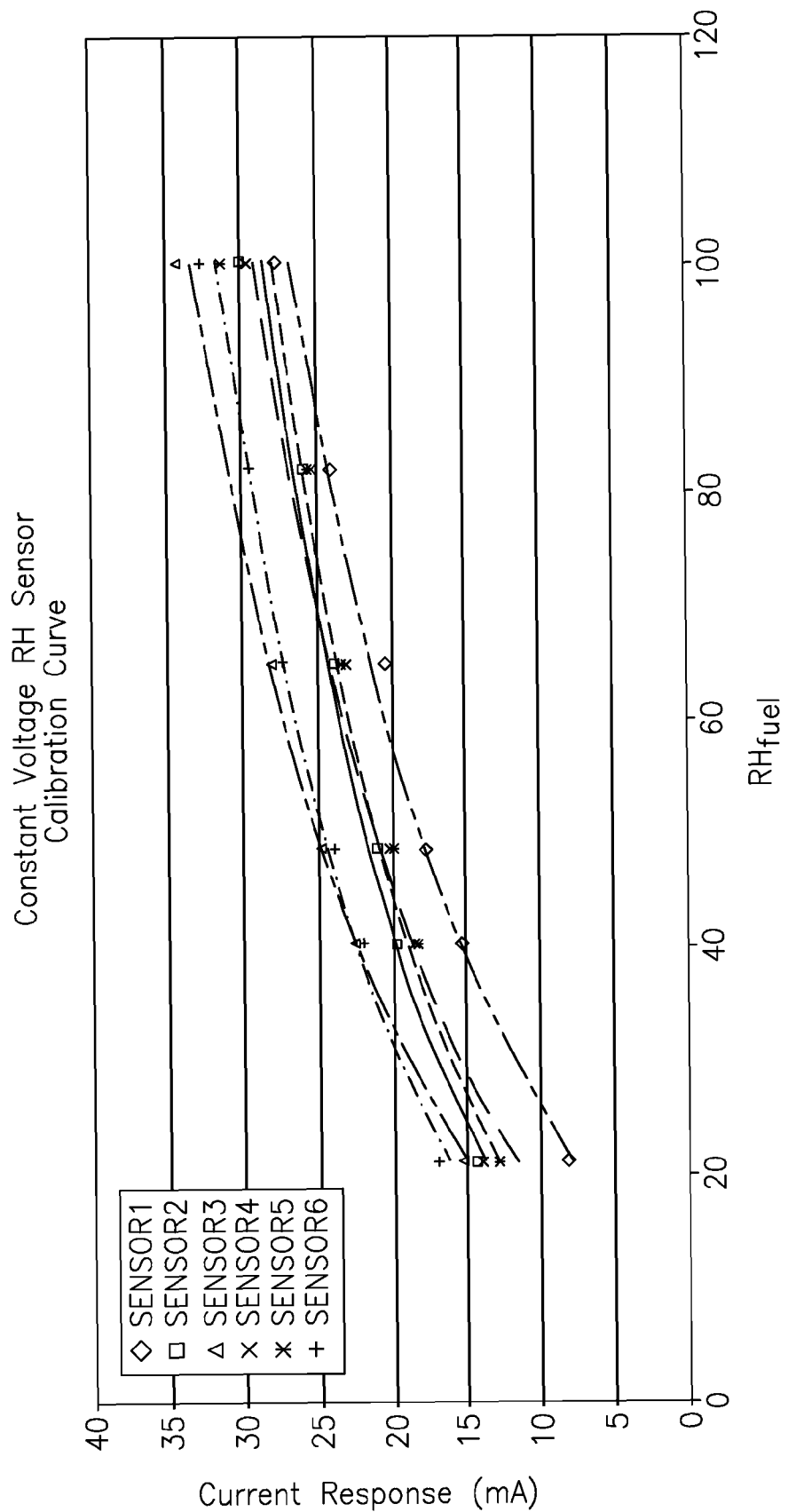
FIG. 9 is a graph showing sensor calibration curves obtained from experiments using prototype sensors.

Tests were conducted on six representative sensors by placing a sensor to be tested between the anode and the anode flow field plate of a fuel cell in a fuel cell stack, feeding fuel with a known relative humidity (RH) to the fuel cell stack, and measuring the current in the electric circuit of the corresponding hydration sensor apparatus while maintaining a constant voltage in such circuit. Each of the sensors tested had the same design and comprised a catalyst-coated membrane (i.e., a Nafion 111 membrane with a thickness of 25 microns). Each of such test MEAs was connected to the electric circuit of the hydration sensor apparatus through platinum foils with a thickness of 25 microns, and the entire sensor was enclosed in perforated electrically conductive layers made of Kapton (each Kapton layer having a thickness of 50 microns and having an adhesive layer of a thickness of 25 microns on the side facing the test MEA). As seen in FIG. 9, the tests conducted show an expected logarithmic relationship between the relative humidity of the fuel and the sensor readings. There were small differences in the test results obtained from the six sensors due to the fact that all prototype sensors were manufactured manually.

While particular steps, elements, embodiments and applications of the present invention have been shown and described herein for purposes of illustration, it will be understood, of course, that the invention is not limited thereto since modifications may be made by persons skilled in the art, particularly in light of the foregoing teachings, without deviating from the spirit and scope of the invention. Accordingly, the invention is not limited except as by the appended claims.

What is claimed is:

1. A fuel cell system comprising a fuel cell stack and at least one hydration sensor apparatus for measuring membrane hydration in the fuel cell stack, the hydration sensor apparatus comprising:
   an electrically insulated sensor comprising a polymer electrolyte membrane;
   a power supply; and
   a load resistor,
   wherein the sensor, the power supply and the load resistor of the hydration sensor apparatus are electrically connected, and wherein the sensor of the hydration sensor apparatus is fluidly connected to the fuel cell stack such that, during operation of the fuel cell system, the polymer electrolyte membrane of the hydration sensor apparatus is exposed to a fuel fluid stream of the fuel cell stack.

2. The fuel cell system of claim 1 wherein the sensor of the hydration sensor apparatus is fluidly connected to an anode outlet port of the fuel cell stack such that, during operation of the fuel cell system, the polymer electrolyte membrane of the hydration sensor apparatus is exposed to a fuel exhaust stream of the fuel cell stack.

3. The fuel cell system of claim 1 wherein the sensor of the hydration sensor apparatus is fluidly connected to an anode inlet port of the fuel cell stack such that, during operation of the fuel cell system, the polymer electrolyte membrane of the hydration sensor apparatus is exposed to a fuel inlet stream of the fuel cell stack.

4. The fuel cell system of claim 1 wherein:
the fuel cell stack comprises a plurality of fuel cells, each fuel cell having an anode and an anode flow field plate having at least one anode flow field channel formed on the surface thereof; and
the sensor of the hydration sensor apparatus is disposed between the anode and the anode flow field plate of one of the plurality of fuel cells of the fuel cell stack such that, during operation of the fuel cell system, the polymer electrolyte membrane of the hydration sensor apparatus is exposed to an internal fuel stream of the fuel cell stack.

5. The fuel cell system of claim 4 wherein the sensor of the hydration sensor apparatus has a surface area equal to the surface area of the anode of the fuel cell.

6. The fuel cell system of claim 4 wherein the sensor of the hydration sensor apparatus has a smaller surface area than the surface area of the anode of the fuel cell.

7. The fuel cell system of claim 4 wherein:
the fuel cell system comprises more than one hydration sensor apparatus; and
the sensor of each of hydration sensor apparatus is disposed between the anode and the anode flow field plate of one of the plurality of fuel cells of the fuel cell stack such that, during operation of the fuel cell system, the polymer electrolyte membrane of each hydration sensor apparatus is exposed to an internal fuel stream of the fuel cell stack.

8. The fuel cell system of claim 1 wherein the fuel cell system comprises more than one hydration sensor apparatus.

9. The fuel cell system of claim 1 wherein the polymer electrolyte membrane of the hydration sensor apparatus is a catalyst-coated membrane, the catalyst-coated membrane comprising a polymer electrolyte membrane, a first electrocatalyst layer and a second electrocatalyst layer.

10. The fuel cell system of claim 9 wherein the first and second electrocatalyst layers of the hydration sensor apparatus are uniformly deposited on opposing surfaces of the polymer electrolyte membrane of the hydration sensor apparatus.

11. The fuel cell system of claim 9 wherein the first and second electrocatalyst layers of the hydration sensor apparatus are selectively deposited on opposing surfaces of the polymer electrolyte membrane of the hydration sensor apparatus such that the first and second electrocatalyst layers are not directly opposite each other.

12. The fuel cell system of claim 9 wherein the sensor of the hydration sensor apparatus further comprises a first gas diffusion layer disposed on one side of the catalyst-coated membrane of the sensor.

13. The fuel cell system of claim 12 wherein the sensor of the hydration sensor apparatus further comprises a second gas diffusion layer disposed on the other side of the catalyst-coated membrane of the sensor opposite the first gas diffusion layer.

14. The fuel cell system of claim 12 wherein the hydration sensor apparatus further comprises:
a first electrically insulated conductive wire electrically connected to the first gas diffusion layer of the sensor; and
a second electrically insulated conductive wire electrically connected to the catalyst-coated membrane of the sensor,
wherein the sensor of the hydration sensor apparatus is electrically connected to the power supply and the load resistor of the hydration sensor apparatus through the first and second electrically insulated conductive wires.

15. The fuel cell system of claim 14 wherein the first and second electrically insulated conductive wires are platinum.

16. The fuel cell system of claim 9 wherein the sensor of the hydration sensor apparatus further comprises:
a first electrically conductive layer disposed on one side of the catalyst-coated membrane of the sensor; and
a second electrically conductive layer disposed on the other side of the catalyst-coated membrane of the sensor opposite the first electrically conductive layer,
wherein the first and second electrically conductive layers are electrically insulated from each other, and
wherein the sensor of the hydration sensor apparatus is electrically connected to the power supply and the load resistor of the hydration sensor apparatus through the first and second electrically conductive layers.

17. The fuel cell system of claim 16 wherein the first and second electrically conductive layers are gas diffusion layers.

18. The fuel cell system of claim 16 wherein the first and second electrically conductive layers are perforated platinum foil layers.

19. The fuel cell system of claim 9 wherein the first and second electrocatalyst layers are porous.

20. The fuel cell system of claim 1 wherein the polymer electrolyte membrane is a proton-exchange membrane.

21. The fuel cell system of claim 20 wherein the hydration sensor apparatus further comprises:
a first electrically insulated platinum wire electrically connected to the proton-exchange membrane of the sensor; and
a second electrically insulated platinum wire electrically connected to the proton-exchange membrane of the sensor,
wherein the sensor of the hydration sensor apparatus is electrically connected to the power supply and the load resistor of the hydration sensor apparatus through the first and second electrically insulated platinum wires.

22. The fuel cell system of claim 21 wherein the first and second electrically insulated platinum wires are partially embedded in the proton-exchange membrane.

23. The fuel cell system of claim 22 wherein the first and second electrically insulated platinum wires are partially embedded in opposing sides of the proton-exchange membrane.

24. The fuel cell system of claim 22 wherein the first and second electrically insulated platinum wires are partially embedded in the same side of the proton-exchange membrane.

25. The fuel cell system of claim 21 wherein the sensor of the hydration sensor apparatus further comprises:
- a first electrically insulating layer; and
- a second electrically insulating layer,
- wherein the first and second electrically insulating layers are disposed on opposing sides of the proton-exchange membrane, and
- wherein the first and second electrically insulated platinum wires are partially embedded in at least one of the first and second electrically insulating layers.

26. The fuel cell system of claim 20 wherein the hydration sensor apparatus further comprises:
- a first electrically insulated conductive wire electrically connected to the proton-exchange membrane of the sensor through a first catalyst contact; and
- a second electrically insulated conductive wire electrically connected to the proton-exchange membrane of the sensor through a second catalyst contact,
- wherein the sensor of the hydration sensor apparatus is electrically connected to the power supply and the load resistor of the hydration sensor apparatus through the first and second electrically insulated conductive wires.

27. The fuel cell system of claim 26 wherein the first and second electrically insulated conductive wires are electrically connected to the proton-exchange membrane on the same side of the proton-exchange membrane.

28. The fuel cell system of claim 26 wherein the first and second electrically insulated conductive wires are electrically connected to the proton-exchange membrane on opposing sides of the proton-exchange membrane.

29. The fuel cell system of claim 20 wherein the hydration sensor apparatus further comprises:
- a first electrically insulated conductive wire electrically connected to the proton-exchange membrane of the sensor through a catalyst layer deposited on one side of the proton-exchange membrane; and
- a second electrically insulated conductive wire electrically connected to the proton-exchange membrane of the sensor through the catalyst layer such that the first and second electrically insulated conductive wires are electrically connected to the proton-exchange membrane on the same side of the proton-exchange membrane,
- wherein the sensor of the hydration sensor apparatus is electrically connected to the power supply and the load resistor of the hydration sensor apparatus through the first and second electrically insulated conductive wires.

30. The fuel cell system of claim 1 wherein the sensor of the hydration sensor apparatus further comprises:
- a first electrically insulating layer; and
- a second electrically insulating layer,
- wherein the first and second electrically insulating layers are disposed on opposing sides of the polymer electrolyte membrane.

31. The fuel cell system of claim 30 wherein the first and second electrically insulating layers are perforated.

32. The fuel cell system of claim 31 wherein the first and second electrically insulating layers are perforated foil.

33. The fuel cell system of claim 1 wherein the polymer electrolyte membrane is porous.

* * * * *